US 6,371,394 B1

(12) United States Patent
Roba

(10) Patent No.: US 6,371,394 B1
(45) Date of Patent: Apr. 16, 2002

(54) METHOD FOR WINDING A FIBRE ELEMENT HAVING DIFFERENT LONGITUDINAL PORTIONS

(75) Inventor: Giacomo Stefano Roba, Monza (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 09/470,887

(22) Filed: Dec. 22, 1999

Related U.S. Application Data

(60) Provisional application No. 60/115,631, filed on Jan. 12, 1999.

(30) Foreign Application Priority Data

Dec. 23, 1998 (EP) .............................. 98124573

(51) Int. Cl.⁷ ........................ B65H 55/04; B65H 54/28; C03B 37/07
(52) U.S. Cl. ........................ 242/178; 65/381; 65/382; 65/479; 65/486; 65/491; 242/480.8; 242/920
(58) Field of Search .............................. 242/178, 476.4, 242/476.7, 480.8, 920; 65/381, 382, 435, 475, 477, 479, 486, 491

(56) References Cited

U.S. PATENT DOCUMENTS

| 3,062,481 A | * | 11/1962 | High et al. ................. 242/165 |
| 3,582,298 A | * | 6/1971 | Trethewey ................. 307/651 |
| 4,138,069 A | | 2/1979 | Bonzo et al. |
| 4,163,370 A | | 8/1979 | Kurth |
| 4,280,827 A | | 7/1981 | Murphy et al. |
| 4,514,205 A | | 4/1985 | Darcangelo et al. |
| 4,707,172 A | * | 11/1987 | Sottini et al. ................. 65/381 |
| 4,793,840 A | * | 12/1988 | Harding ................. 65/381 |
| 4,969,941 A | | 11/1990 | Kyoto et al. |
| 5,073,179 A | | 12/1991 | Yoshimura et al. |
| 5,114,338 A | | 5/1992 | Tsuchiya et al. |
| 5,209,416 A | * | 5/1993 | LeCompte ................. 242/159 |
| 5,314,515 A | | 5/1994 | Cain |
| 5,316,562 A | | 5/1994 | Smithgall et al. |
| 5,366,527 A | | 11/1994 | Amos et al. |
| 5,400,422 A | | 3/1995 | Askins et al. |
| 5,449,393 A | * | 9/1995 | Tsuneishi et al. ......... 65/381 X |
| 5,551,967 A | | 9/1996 | Urruti |
| 6,002,472 A | * | 12/1999 | Naka et al. ................. 250/559.24 |
| 6,241,177 B1 | * | 6/2001 | Schroter et al. ......... 242/476.2 |
| 6,272,886 B1 | * | 8/2001 | Novack et al. ............. 430/290 |
| 6,308,906 B1 | * | 10/2001 | Pyra et al. ................. 242/476.3 |

OTHER PUBLICATIONS

Ohashi, M., et al. "Dispersion–Modified Single–Mode Fiber by VAD Method", The Transactions of the IEICE, vol. E73 No. 4, pp. 571–576, (1990).

* cited by examiner

Primary Examiner—Michael R. Mansen
(74) Attorney, Agent, or Firm—Finnegan, Henderson, Farabow, Garrett & Dunner, L.L.P.

(57) ABSTRACT

Method for winding a fiber element onto a support. The fiber element having at least two longitudinal portions ($P_i$) with different characteristics. The method including the steps of supplying the fiber element to the support and associating with each longitudinal portion a respective value of the winding pitch ($p_i$) which is different from the values associated with the portions adjacent thereto. The winding pitch associated with each portion being modulated in accordance with a periodic function.

25 Claims, 5 Drawing Sheets

METHOD FOR WINDING A FIBRE ELEMENT HAVING DIFFERENT LONGITUDINAL PORTIONS

This application is based on European Patent Application No. 98124573.1 filed on Dec. 23, 1998 and U.S. Provisional Application No. 60/115,631 filed on Jan. 12, 1999, the content of which is incorporated hereinto by reference.

BACKGROUND OF THE INVENTION

The present invention relates to a method for winding a fibre element having different longitudinal portions. In particular, the present invention relates to a method for winding an optical fibre having different longitudinal portions onto a reel at the end of a process for drawing the said fibre.

For the purposes of the present invention, "fibre element" is understood as meaning an optical fibre, where appropriate provided with a surface coating and with other coatings.

As is known in the art, optical fibres are produced in special drawing towers from preforms which have been prepared beforehand. In practice, a preform is supplied, along a vertical direction, to a furnace so as to obtain a casting of molten material. The molten material is then drawn and cooled so as to obtain an optical fibre with the desired characteristics. These characteristics are obtained by suitably setting the parameters of the drawing process, namely the furnace temperature, the fibre drawing speed, and all the other parameters (described in detail below) which define the process conditions. At the end of the drawing process, the optical fibre is wound onto a storage reel, from where it is later unwound at the time of use, either for carrying out tests or so as to rewind it onto other reels.

Generally, the drawing process is carried out for its entire duration under the same process conditions, i.e. without any variation in the process parameters. In such a case, a fibre is drawn from a single preform such that it is substantially homogeneous and uniform along its whole length. At the end of the production process, this fibre is wound onto the storage reel in a cylindrical helix, without interruption and with a constant pitch. For the purposes of the present invention, "winding pitch" is understood as meaning the distance between two consecutive intersections of the helix with the same generatrix of the cylinder on which the said helix lies. Helical winding with a constant pitch is usually obtained by moving the reel axially so that it performs an alternating movement at a constant speed or by moving a member which supplies the fibre to the reel so that it performs a similar movement.

Drawing towers of the known type, owing to recent progress in technology, allow optical fibres which are up to several hundred kilometers long to be obtained from a single preform. In the future, technological improvements will probably result in even longer fibres being obtained from a single preform. In view of the high yields which can already be obtained nowadays in drawing processes, it may be necessary or advantageous to form, from a single preform, a fibre comprising longitudinal portions which have different chemical/physical characteristics, for example longitudinal portions with different core and/or cladding diameters, different internal tensions, etc. These physical variations may be obtained by changing, during the fibre drawing process, one or more characteristic process parameters.

For example, it may be advantageous to form a fibre comprising two or more longitudinal portions having substantially the same basic characteristics, but with one or more differences of an optical, geometric or mechanical nature. A first example is provided by M. Ohashi et al. in "Dispersion-Modified Single Mode Fiber by VAD Method", NTT, Japan, The Transaction of the IEICE, Vol. E 73, No. 4, April 1990. In this article, in order to study the sensitivity of single mode optical fibres with a low dispersion of about 1.5–1.6 µm to micro-bendings, fibre portions which are several kilometers long are used, said fibres being made from a single preform and being different from one another solely in terms of the zero-chromatic-dispersion wavelength.

A further example relates to the study of the phenomenon of modal dispersion due to polarization ("Polarization Mode Dispersion"or PMD). As is known, this phenomenon is influenced by the photoelastic effect which occurs in the fibre, this being dependent upon structural characteristics associated with the tension to which the said fibre is subjected during the drawing process. For this type of study it is therefore advantageous to have fibre portions available that have the same physical/chemical characteristics and different internal tensions. U.S. Pat. No. 5,400,422 proposes a technique for forming, in an optical fibre, a sequence of Bragg gratings of varying pitch, during the actual fibre drawing process. The gratings are formed by exposing the fibre, using optical techniques of the interferometric type, to ultraviolet radiation pulses. The gratings are formed at predefined distance from each other along the fibre. In this case also, therefore, fibre portions with different characteristics are formed by varying, during the drawing process, the operating conditions of the process.

In other instances it may be necessary to produce local variations in the characteristics of the drawn fibre, i.e. variations affecting only small sections of the said fibre. A situation of this type is described in U.S. Pat. No. 4,163,370, in which a short section of fibre with a larger diameter is formed in order to improve the performance of the fibre in terms of modal dispersion.

The Applicant has noticed that, in cases where it is required to form a fibre comprising longitudinal portions which are different from one another, winding onto the reel without interruptions and with a constant pitch is not very advantageous since the different portions of wound fibre cannot subsequently be distinguished from one another. One way of solving this problem is to interrupt the winding process and, therefore, the drawing process, whenever a given fibre portion has been completely wound so as to be able to cut the fibre at the end of this portion and replace the reel onto which this portion has been wound with an empty reel. At this point, the winding process (and the drawing process) can be started again and the next fibre portion is wound onto a new reel. The need to interrupt the drawing process every time, however, gives rise to certain drawbacks, including loss of time, wastage of molten material from the preform and a possible variation in the drawing conditions, for example due to temporal variations in the characteristic parameters of the process.

Alternatively, if the fibre must be completely wound onto the same reel, it is possible, instead of cutting the fibre at the end of each wound portion, apply a marker to a predefined point on each portion, which can be subsequently identified. This operation may even be performed without interrupting the drawing process, as described in the already cited U.S. Pat. No. 5,400,422. However, the use of markers to identify the different fibre portions is unreliable since, at the normal fibre unwinding speeds, one or more of these markers could be accidentally overlooked. Moreover, this technique generally requires the presence of an operator during unwinding of the fibre, who is responsible for identification of the markers.

BRIEF SUMMARY OF THE INVENTION

The Applicant has found that, in the case of a fibre comprising longitudinal portions which are different from one another, if the fibre is wound by associating with each portion a respective winding pitch different from the winding pitches of the adjacent portions, subsequent identification of these portions during unwinding of the fibre can be performed rapidly, automatically and with very small probability of error. The Applicant proposes, inter alia, a winding method which can be performed without interruptions, thus avoiding the abovementioned drawbacks.

The Applicant has also found that, in order to reduce to a minimum the probability of error in identifying the various fibre portions during unwinding of the said fibre, it is preferable to modulate the winding pitch with periodic functions. This variation in the winding pitch is preferably performed by modulating, with the same law, the speed of axial translation of the reel during winding. If the fibre has been wound in this way, subsequent identification of the different fibre portions during unwinding from the reel is performed, in accordance with the invention, by detecting the variations in the winding pitch.

According to a first aspect, the present invention relates to a method for winding a fibre element onto a support, said fibre element comprising at least two longitudinal portions with different characteristics, said method comprising the step of supplying said fibre element to said support and being characterized in that it comprises the step of associating with each of said portions a respective value of a winding parameter which is different from the values associated with the portions adjacent thereto. In particular, said step of associating a respective value of a winding parameter with each of said portions comprises the step of associating a respective winding pitch with each of said portions.

In particular, said step of associating a respective winding pitch with each of said portions comprises the step of associating a respective function for modulation of said winding pitch with each of said portions.

Preferably said step of associating a respective function for modulation of said winding pitch with each of said portions comprises the step of associating a respective frequency for modulation of said winding pitch with each of said portions, said modulation frequency defining the main frequency of a respective periodic modulation function.

In particular, said step of associating a respective winding pitch with each of said portions comprises the step, performed at the same time as said step of supplying said fibre element to said support, of translating said support in a predefined direction at a speed correlated to said winding pitch.

Said step of supplying said fibre element to said support comprises the step of directing said fibre element towards said support by means of a supply member and, by way of an alternative to that described above, said step of associating a respective winding pitch with each of said portions comprises the step, performed at the same time as said directing step, of translating said supply member in a predefined direction at a speed correlated to said winding pitch.

Preferably said step of supplying said fibre element to said support is associated with a starting instant and with an end instant and comprises the steps of measuring the time between said starting instant and said end instant and to associate with each of said portions a respective time interval between said starting instant and said end instant.

Preferably, said fibre element is an optical fibre, said step of supplying said fibre element to said support being performed at the same time as a step for producing said optical fibre; said production step comprising the step of drawing said optical fibre from a preform. Said production step comprises the preliminary step of setting process parameters so as to obtain predefined characteristics of said fibre element, each of said portions being associated with a respective set of values of said parameters.

Moreover, preferably, said production step comprises the step, performed during said drawing step, of measuring process variables and signalling, if one of said variables exceeds a predefined threshold, a respective alarm condition indicating the presence of a fibre portion with a defect; said step of associating a respective value of a winding parameter with each of said portions comprises the step of associating a respective value of said winding parameter with said fibre portion which has a defect.

According to a further aspect, the present invention relates to a method for distinguishing different longitudinal portions of a fibre element wound onto a support according to the method described above, each of said portions having associated with it a respective winding pitch, characterized in that it comprises the steps of:

unwinding said fibre element from said support;

detecting, during said unwinding step, variations in said winding pitch;

In particular, said step of detecting variations in said winding pitch comprises the steps of:

repeatedly measuring, during said unwinding step, a parameter correlated to said winding pitch in order to obtain successive values of said parameter; and detecting variations in the value of said parameter.

Preferably, said method for distinguishing different longitudinal portions also comprises the steps of:

comparing each of said obtained values of said parameter with a set of stored values, each of said stored values being associated with one of said portions; and identifying, on the basis of said comparison, the longitudinal portion associated with said value obtained.

Preferably, said step of detecting variations in the value of said parameter comprises the steps of:

storing a value obtained;

comparing a successive value of said parameter with said stored value; and interrupting said unwinding step if, during said comparison step, said successive value is different from said stored value.

Preferably, said step of measuring said parameter comprises the step of detecting the distance between an actual point where a predefined area is crossed by the fibre element and a predefined crossing point of the said area.

By way of an alternative, said step of measuring said parameter comprises the step of detecting the angle between a direction of unwinding of the fibre element from the support and a predefined direction.

According to a further aspect, the present invention relates to an apparatus for winding a fibre element onto a support, said fibre element comprising at least two longitudinal portions with different characteristics, said apparatus comprising:

a supply member for supplying said fibre element to said support; and a moving device for moving either one or other of said support and said supply member along a predefined axis and at a predefined speed of translation so as to obtain a predefined winding pitch;

and being characterized in that it comprises a unit for controlling said moving device, designed to control said speed of translation so as to associate with each of said portions a respective winding pitch different from the winding pitches associated with the portions adjacent thereto.

Preferably, at least one of said winding pitches is modulated with a periodic function.

Preferably, said fibre element is an optical fibre. According to further aspect, the present invention relates to an apparatus for distinguishing different longitudinal portions of a fibre element wound onto a support, each of said portions having associated with it a respective winding pitch, characterized in that it comprises:

a device for unwinding said fibre element from said support;

a sensor device designed to measure repeatedly a parameter correlated to said winding pitch and generate a signal indicating said parameter; and a processing unit designed to receive said signal and detect, on the basis of said signal, variations in said parameter.

In particular, said processing unit comprises:

a comparison sub-unit for comparing successive values of said parameter; and a signalling sub-unit for signalling the presence of a new portion if said successive values are different from one another.

Preferably, said sensor device is an optical device which has a sensitive area and a reference point on said sensitive area and is designed to detect the distance between the point where said sensitive area is crossed by the said fibre element and said reference point.

Alternatively, said sensor device is a device designed to detect the angle between a direction of unwinding of the fibre element from the support and a predefined direction.

According to a further aspect, the present invention relates to a method for producing a fibre element, said method comprising the step of drawing said fibre element from a preform and forming two longitudinal portions with different characteristics of said fibre element, and being characterized in that it comprises the step of winding said two longitudinal portions onto a support, associating a respective winding pitch with each of said two longitudinal portions.

According to a last aspect, the present invention relates to an assembly for the production of a fibre element, comprising a production apparatus designed to produce a fibre element comprising at least two longitudinal portions having characteristics which are different from one another; said assembly being characterized in that it also comprises a winding apparatus designed to receive said fibre element from said production apparatus and wind said fibre element onto a support, associating a respective winding pitch with each of said portions.

In particular, said winding apparatus comprises:

a supply member for supplying said fibre element to said support in a predefined supplying direction; and an axial moving device for moving either one or other of said support and said supply member in a predefined direction and at an axial speed which, for each of said portions, is correlated to the winding pitch associated with said portion.

Preferably, said winding apparatus comprises a control unit connected to said axial moving device for controlling said axial speed.

Preferably, said production apparatus comprises sensor devices connected to said control unit, each of said sensor devices being designed to detect a respective process variable.

Preferably, said assembly also comprises an apparatus for distinguishing different longitudinal portions of said fibre element wound onto said support, said distinguishing apparatus comprising:

an unwinding device designed to unwind said fibre element from said support; and a detector device for detecting variations in said winding pitch during unwinding of said fibre element.

In particular, said detector device comprises:

a sensor device designed to generate a signal correlated to said winding pitch;

a processing unit designed to receive said signal and obtain, from said signal, a value indicating said winding pitch.

In particular, said sensor device is an optical sensor designed to be crossed by said fibre element.

Preferably said fibre element is an optical fibre and said production apparatus is a drawing tower.

BRIEF DESCRIPTION OF THE DRAWINGS

Further details may be obtained from the following description which refers to the accompanying drawings listed below.

DETAILED DESCRIPTION OF THE INVENTION

Figure 1:
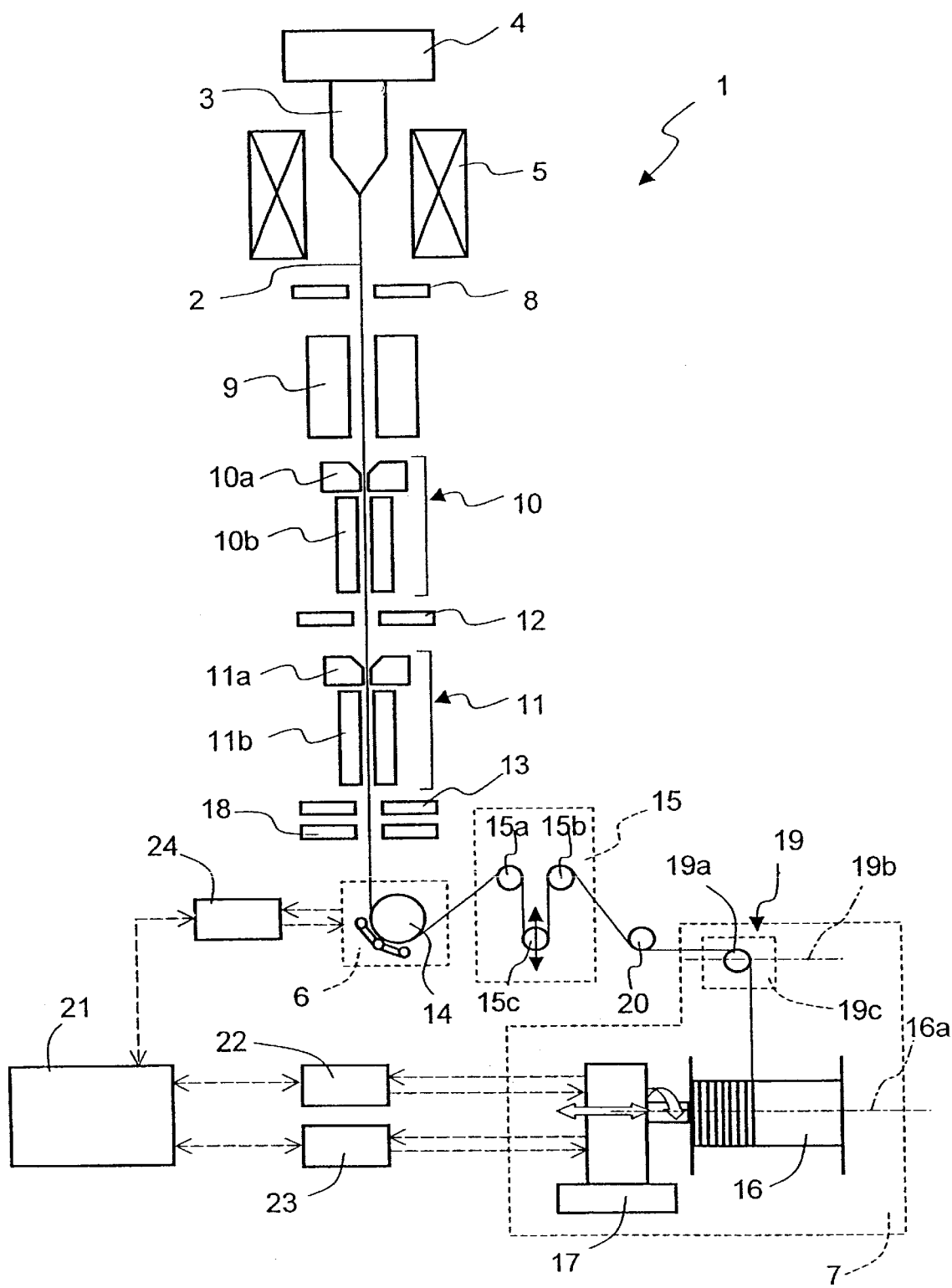
FIG. 1 relates to a tower for drawing an optical fibre formed in accordance with the invention.

FIG. 1 shows a drawing tower 1 designed to perform drawing of an optical fibre 2 from a preform 3 which has been prepared beforehand. The drawing tower 1 comprises a plurality of parts which are substantially aligned in a vertical drawing direction (whence the term "tower"). The choice of a vertical direction in order to perform the main steps of the drawing process arises from the need to exploit the gravitational force so as to obtain, from the preform 3, a casting of molten material from which the fibre 2 can be drawn.

In detail, the tower 1 comprises a device 4 for supporting and supplying the preform 3, a furnace 5 for performing the controlled melting of the preform 3, a drawing device 6 for drawing the fibre 2 from the preform 3 and a device 7 for winding the fibre 2.

The furnace 5 may be of any type designed to produce the controlled melting of a preform. Examples of furnaces which can be used in the tower 1 are described in U.S. Pat.

Nos. 4,969,941 and 5,114,338. The furnace 5 may be provided with a temperature sensor (not shown) designed to generate a signal indicating the temperature inside the furnace. The furnace temperature is a process parameter which may be varied during the drawing process in order to vary the characteristics of the fibre 2, for example in order to change the tension of the fibre 2.

Preferably, at the outlet of the furnace 5 there is a first diameter sensor 8, for example an optical sensor of the interferometric type, which is designed to generate a signal indicating the diameter of the fibre 2 without any coatings. Preferably, the first diameter sensor 8 also performs the function of a surface defect detector, detecting defects in the glass of the fibre 2, such as bubbles or inclusions. The first diameter sensor 8 may be, for example, a sensor of the LIS-G type which is manufactured by the company CERSA, Park Expobat 53, Plan de Campagne, F13825, Cabriès, Cedex, France. This type of sensor is designed, in particular, to generate a first signal proportional to the difference between the detected diameter value and a predefined diameter value, and a second signal indicating the presence of any surface defects.

A cooling device 9 is situated underneath the furnace 5 and the diameter sensor 8 and may, for example, be of the type having a cooling cavity designed to be passed through by a flow of cooling gas. The cooling device is arranged coaxially with respect to the drawing direction, so that it can be passed through by the fibre 2 leaving the furnace 5. The device 9 may be, for example, of the type described in U.S. Pat. No. 5,314,515 or the type described in U.S. Pat. No. 4,514,205. The cooling device 9 may be provided with a temperature sensor (not shown) designed to provide an indication of the temperature in the cooling cavity. Since the speeds at which an optical fibre is drawn are usually relatively high, the cooling device 9 must allow rapid cooling of the fibre 2 to a temperature suitable for the successive processing steps and, in particular, suitable for the surface coating described below. The temperature in the cooling cavity is a process parameter which may be suitably varied, for example by varying the flow of cooling gas, in order to modify the characteristics of the fibre 2.

A first and a second coating device 10, 11, positioned underneath the cooling device 9 in the vertical drawing direction, are designed to deposit onto the fibre 2, as it passes through, a first protective coating and, respectively, a second protective coating overlapped to the first one. Each coating device 10, 11 comprises, in particular, a respective application unit 10*a*, 11*a* which is designed to apply onto the fibre a predefined quantity of resin, and a respective curing unit 10*b*, 11*b*, for example a UV-lamp oven, for curing the resin, thus providing a stable coating. The quantity of resin applied to each application unit 10*a*, 11*a* and the temperature in each curing unit 10*b*, 11*b* are parameters which may be varied during the drawing process in order to produce fibre portions with different coatings. The coating devices 10, 11 may be, for example, of the type described in U.S. Pat. No. 5,366,527 and may consist of a number different from that indicated, depending on the number of protective coatings which are to be formed on the fibre 2.

At the outlet of the first and second coating device 10, 11 there may be provided a second and, respectively, a third diameter sensor 12, 13, for example of the type described in U.S. Pat. No. 4,280,827, which are designed to generate respective signals indicating the diameter of the fibre 2 after application of the first and, respectively, the second protective coating. These signals may be, for example, proportional to the difference between the diameter values measured and predefined diameter values.

Preferably, the tower 1 also comprises a coating defect detector 18, which is positioned underneath the third diameter sensor 13 and is designed to detect the presence of defects such as bubbles, necks or lumps in the surface coatings and to generate a signal indicating the presence of any surface defects. The detector 18 may be, for example, of the type 360 FlawDetector which is manufactured by the company BETA LASERMIKE, 8001 Technology Blvd. Dayton, Ohio, 45424, USA.

The drawing device 6 is positioned underneath the coating devices 10, 11 and is preferably of the single pulley or double pulley type. In this specific case, the drawing device 6 comprises a single motor-driven pulley 14 which is designed to draw the fibre 2 in the vertical drawing direction. The drawing device 6 may be provided with an angular velocity sensor which is designed to generate a signal indicating the angular velocity of the pulley 14 during its operation. The speed of rotation of the pulley 14 and, therefore, the drawing speed of the fibre 2 during the drawing process, are process parameters which may be varied during the drawing process in order to form fibre portions with different characteristics. For example, the drawing speed of the fibre 2 may be varied, on its own or in combination with the temperature inside the furnace 5, in order to produce a variation in the internal tension in the fibre 2 and/or produce a variation in diameter of said fibre 2. This drawing speed is preferably greater than 5 m/s, and more preferably greater than 10 m/s.

If it is required to detect the tension of the fibre 2 during the drawing process, the tower 1 may be provided with a tension monitoring device (not shown) which is preferably positioned between the furnace 5 and the drawing device 6 and is designed to generate a signal indicating the tension of the fibre 2. The monitoring device may, for example, be of the type described in U.S. Pat. No. 5,316,562.

In the case where, during the drawing process, undesired variations in the diameter of the fibre 2 occur, the signals of the diameter sensors 8, 12 and 13 may be used to vary automatically the drawing speed of the fibre 2 so as to obtain once again the predefined diameter value. In practice, if the diameter is reduced to below a predefined threshold, the drawing speed is decreased by an amount proportional to the reduction in diameter, while if the diameter is increased above a further predefined threshold, the drawing speed is increased by an amount proportional to the increase in diameter. Examples of the use of diameter sensor signals and surface defect sensors are provided by U.S. Pat. Nos. 5,551,967, 5,449,393 and 5,073,179. The number and the arrangement of the diameter sensors and surface defect sensors may be different from those indicated.

Preferably, the tower 1 comprises a device 15 for adjusting the tension of the fibre 2, which device is positioned between the drawing device 6 and the winding device 7 and is designed to counterbalance any variations in tension of the fibre 2. The device 15 comprises, preferably, a first and a second pulley 15*a*, 15*b* which are mounted idle and in a fixed position and a third pulley 15*c* which is free to move, under the action of its own weight and the tension of the fibre 2, in the vertical direction indicated in FIG. 1. In practice, the pulley 15*c* is raised if there is an undesirable increase in the tension of the fibre 2 and is lowered if there is an undesirable decrease in the tension of the fibre 2, so as to keep the said tension constant. The pulley 15*c* may be provided with an axial position sensor which is designed to generate a signal indicating the vertical position of the pulley 15*c* and therefore indicating the tension of the fibre 2. A similar device for adjusting the tension of the fibre may be positioned upstream of the drawing device 6, as described in U.S. Pat. No. 4,163,370.

The winding device 7 comprises a reel 16 and a member 17 for supporting and moving the reel 16. The reel 16 has an axis 16a and defines a cylindrical support surface for the fibre 2. The member 17 is designed to support the reel 16 and move the reel 16, in a controlled manner, both about the axis 16a and along the axis 16a.

The winding device 7 also comprises a device 19 for supplying the fibre, which is designed to supply the fibre 2 to the reel 16 in a direction substantially perpendicular to the axis 16a. In the particular embodiment shown in FIG. 1, the device 19 comprises a pulley 19a which is positioned opposite the reel 16 and is designed to receive the fibre 2 from the tension adjusting device 15 and supply the fibre 2 to the reel 16. A further pulley 20 may be present in order to guide the fibre 2 from the tension adjusting device 15 towards the pulley 19a. Any other pulleys (or guiding elements of another type) may be used, as required. The winding device 7 comprises moreover a linear velocity sensor and an angular velocity sensor (not shown), for example encoders, which are designed to generate respective signals indicating the speed of translation of the reel 16 along the axis 16a and, respectively, the speed of rotation of the reel 16 about the axis 16a.

The drawing tower 1 also comprises a processing and control unit 21 which is electrically connected to the sensors and the detectors present along the tower 1 and to all the parts of the said tower 1, whose operation may be controlled from the outside. The unit 21 is designed to control the various steps of the drawing process on the basis of the values of pre-set process parameter values and on the basis of the signals generated by the sensors and by the detectors positioned along the tower 1. Exchange of information between the unit 21 and the various parts of the tower 1 to which it is connected takes place by means of electronic interfaces (only three of which—22, 23, 24—are shown, for the sake of clarity), said interfaces being able to convert the digital signals generated by the said unit 21 into analogue signals (for example electrical voltages) suitable for operating the individual parts, and also to convert the analogue signals received from the sensors and the detectors into digital signals designed to be interpreted by said unit 21. The unit 21 is also designed to compare the value of the parameters measured by the sensors and by the detectors positioned along the tower 1 with predefined threshold values and, in the event of one of these threshold values being exceeded, to generate an alarm code $A_j$ indicating a j-th alarm condition.

The three electronic interfaces 22–24 shown in FIG. 1 are designed to allow the exchange of information between the unit 21 and the drawing device 6 and winding device 7. In detail, a first interface 22 allows the unit 21 both to send control signals to the motor-driven member of the drawing device 6, so as to control the angular velocity of the pulley 14, and to receive information from the angular velocity sensor associated with said drawing device 6. A second control interface, indicated by 23, allows the unit 21 both to send control signals to the member 17, so as to control the speed of rotation of the reel 16, and to receive signals from the angular velocity sensor associated with the winding device 7. A third control interface 24 allows the unit 21 both to send control signals to the member 17, so as to control the speed of translation of the reel 16 along the axis 16a, and to receive signals from the linear velocity sensor associated with the winding device 7.

During the process of winding of the fibre 2, the translatory movement of the reel 16 allows helical winding of the fibre 2 to be performed. Alternatively, helical winding of the fibre 2 onto the reel 16 may be performed by keeping the reel 16 axially fixed and translating the pulley 19a in a direction 19b parallel to the axis of said reel 16. This translatory movement is performed by a moving member 19c (shown only schematically by means of a broken line) which is controlled by the unit 21 and the axial position of the pulley 19a is detected by an axial position sensor (not shown). Both in the case where the pulley 19a is fixed and the reel 16 is movable and in the case where the pulley 19a is movable and the reel 16 fixed, the direction of supply of the fibre 2 to the reel 16 is displaced, parallel to itself, within a spatial interval having an amplitude equal to the length of the reel 16. The method for winding the fibre 2 onto the reel 16 in a controlled manner will be described below with reference to the flow diagram of FIG. 6.

Figure 2:
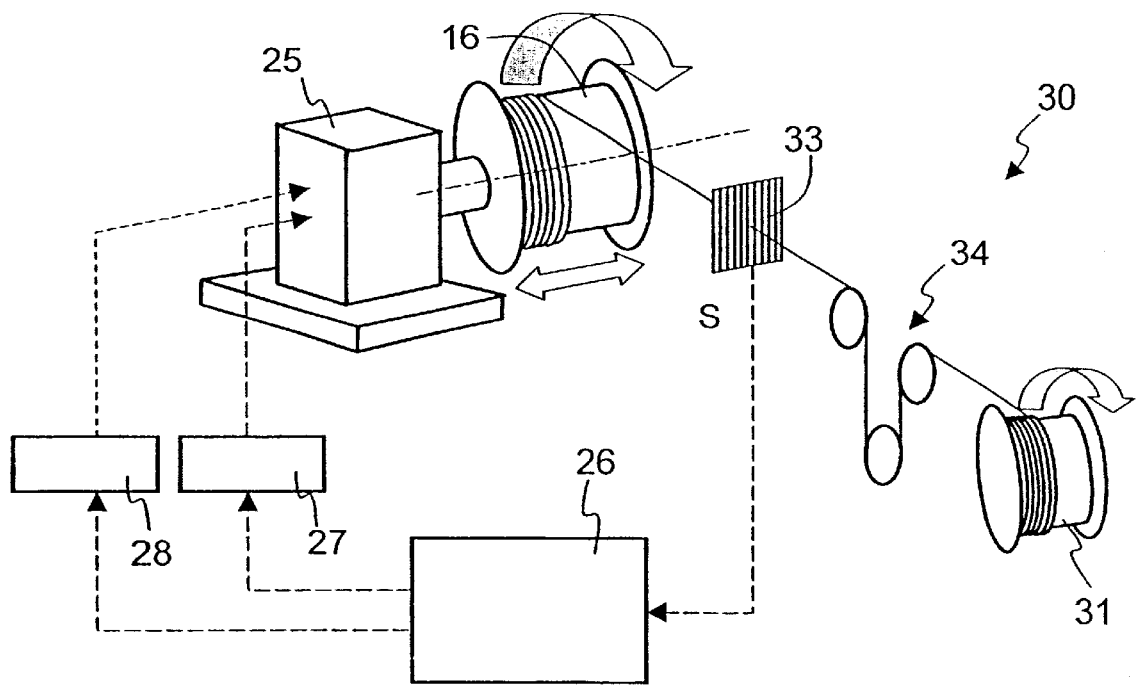
FIG. 2 illustrates an apparatus for unwinding a fibre from a reel in accordance with the method of the invention.

After the fibre has been completely drawn and wound, in order to be used it must be unwound from the reel 16. In FIG. 2, 30 indicates a device which allows unwinding of the fibre 2 from the reel 16, identification of the different portions of the fibre 2 and individual rewinding of these portions onto a respective reel 31.

The device 30 comprises a member 25 for supporting and moving the reel 16, a member (not shown) for supporting and angularly moving the reel 31, a processing and control unit 26, an optical sensor 33 and, preferably, a device 34 for adjusting the tension of the fibre, for example of the same type as the device 15 according to FIG. 1. If necessary, the device 30 may also comprise a device for automatic replacement of the reel 31, for example of the type described in U.S. Pat. No. 4,138,069.

The first member 25 is designed to move the reel 16, in a controlled manner, both about its axis and along its axis and may consist, for example, of the member 17 already used for winding. The unit 26 is designed to operate the moving member 25 by means of electronic interfaces 27 and 28 (equivalent to the interfaces 22 and 23 in FIG. 1) and may consist, for example, of the unit 21 used for winding. If the unit 26 is different from the unit 21, it is assumed that it has access to all the information stored in the unit 21 prior to or during the drawing and winding process.

The optical sensor 33 may consist of a position detector of the parallel-ray type, matrix type (comprising a CCD photocamera) or any other type suitable for detecting, in at least one direction, the position in its sensitive area of a body having the same dimensions as the transverse dimensions of the fibre 2.

The optical sensor 33 is arranged opposite the reel 16 in a position such that, during unwinding of the fibre 2, its sensitive area is crossed by the fibre 2. The optical sensor 33 is electrically connected to the processing unit 26 and is designed to transmit to the unit 26, during unwinding of the fibre 2, a signal S indicating the distance between the actual point where the sensitive area is crossed by the fibre 2 and a predefined crossing point, for example the central point of the sensitive area.

The processing unit 26 is designed to use the information contained in the signal S in order to adjust the speed of translation of the reel 16. At every instant, in fact, the speed of translation is varied by a quantity proportionally with respect to the absolute value and the sign of the signal S, so as to cause the fibre 2 to pass through the sensitive area of the optical sensor 33 at the predefined crossing point, thereby minimizing the signal S.

At each instant, the distance between the actual crossing point and the predefined crossing point is dependent upon the spatial law associated with the winding pitch of the portion considered. The signal S and, consequently, the speed of translation of the reel 16 are therefore modulated in accordance with a time law correlated to the spatial law which governs the winding pitch.

Figure 3:
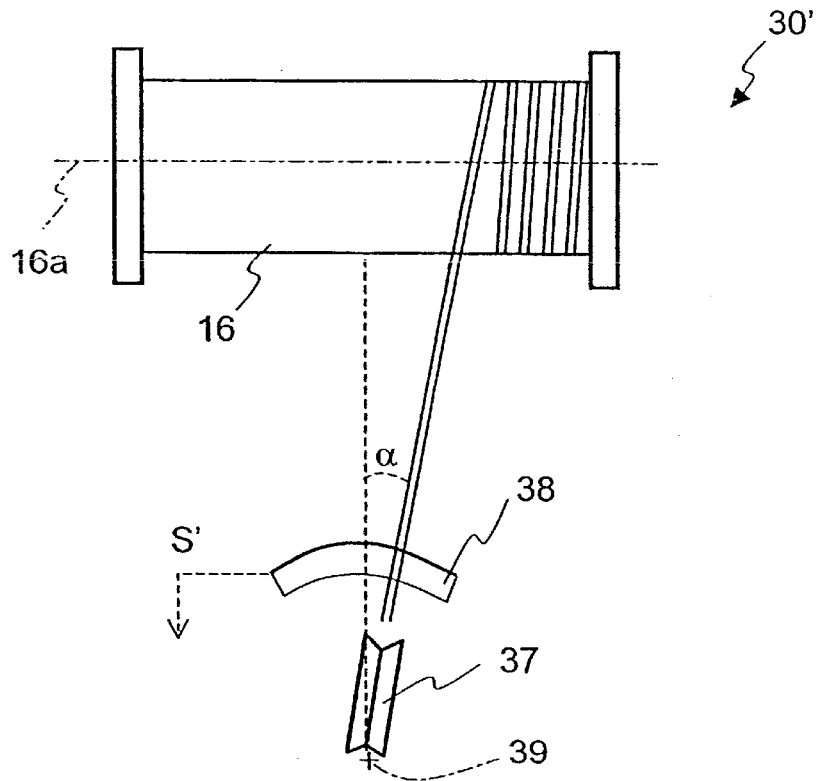
FIG. 3 shows, with parts removed for the sake of clarity, a variation on the apparatus shown in FIG. 2.

FIG. 3 shows, in a schematic and partial manner, a possible variation on the unwinding device 30. The device in FIG. 3, which is indicated by 30', differs from the device 30 in that the optical sensor 33 is replaced by a pivoting pulley 37 (which may be, for example, the first pulley of the tension adjusting device 34) and an angular position sensor 38 (for example an encoder). The pulley 37 is positioned in front of the reel 16 so as to receive the fibre 2 during unwinding and is designed to pivot about an axis 39 perpendicular to the plane of the figure. The angular position sensor 38 is positioned between the pulley 37 and the reel 16 and is designed to detect the angle α at which the fibre 2 reaches the pulley 37, measured with respect to a direction (shown in broken lines) perpendicular to the axis 16a. During unwinding, the reel 16 is kept axially fixed, so that the angle α is, at each instant, correlated to the winding pitch of the portion in question. Therefore, in a similar manner to the preceding case, the sensor 38 is designed to generate a signal S', the time progression of which is correlated to the spatial progression of the winding pitch.

The drawing tower 1 shown in FIG. 1 and the unwinding device 30 in FIG. 2 (or, alternatively, the device 30' in FIG. 3) allow implementation of an automated method for the production and winding of a fibre with different longitudinal portions and for the subsequent identification of these portions during unwinding of said fibre.

During the drawing process, the fibre portions with different characteristics may be formed voluntarily by varying one or more process parameters (such as, for example, the temperature inside the furnace 5), or involuntarily, owing to unwanted variations in the process parameters themselves or owing to the presence of defects in the fibre 2 during drawing. For example, the fibre 2 may be homogeneous and uniform over its whole length, except for one or more short sections where defects or desired modifications are present. A typical example is that described in the already cited U.S. Pat. No. 4,163,370, in which a short fibre section with a larger diameter is formed in order to improve the performances of the fibre in terms of modal dispersion. In other examples of practical interest, such as those described in the introduction of the present patent, the fibre may comprise a plurality of adjacent portions which are different to one another. For the description of the method according to the present invention, the general example of a fibre 2 comprising N longitudinal portions $P_1, P_2 \ldots, P_N$ (where N>2) with different characteristics is considered.

According to the invention, during the winding process, the winding pitch is varied for each different fibre portion in order to distinguish this portion from the adjacent portions. In this way, during the subsequent process of unwinding of the fibre 2, each different portion can be identified on the basis of its winding pitch. In practice, according to the invention, respective winding pitches $p_1, p_2, \ldots, p_N$ are associated with the N portions $P_1, P_2, \ldots, P_N$, said pitches being chosen so that different winding pitches are associated with adjacent portions. The winding pitches $p_1, p_2, \ldots, p_N$ are chosen in accordance with predefined spatial laws. More particularly, the winding pitch $p_i$ of the generic portion $P_i$ is a function of the abscissa x measured along the axis 16a of the reel 16 and can therefore be expressed by means of a function $p_i(x)$. A minimum value for the winding pitch is established by the diameter of the wound fibre 2. Too high values of the winding pitch are to be avoided since they would result in an excessive wastage of space on the reel 16. It is therefore possible to define a preferred range of values of the winding pitch. For example, for a fibre which has a diameter of about 0.25 mm, a preferred winding pitch range may be between 0.3 mm (chosen with reference to working tolerances) and 3 mm.

In the simplest case, the winding pitches $p_1, p_2, \ldots, p_N$ may have constant values which are different from one another. For example, if the fibre 2 comprises four different portions $P_1, P_2, P_3, P_4$, the winding pitches may have the following values: $p_1$=0.3 mm, $p_2$=1.2 mm, $p_3$=2.1 mm, $p_4$=3 mm. The measurement of a constant winding pitch may however be affected by unpredictable factors, due for example to vibrations during the winding step or during unwinding of the fibre 2. If the fibre 2 comprises several different portions and, therefore, if the pitch values chosen in the preferred interval are close to one another, identification of the different portions during the process of unwinding of the fibre 2 could prove difficult.

Preferably, in order to be able to recognize the different fibre portions with the greatest accuracy independently of the number of portions present, the winding pitches are modulated in accordance with spatial functions of the periodic type. The modulation of the winding pitches is obtained by modulating, in accordance with time functions corresponding to the abovementioned spatial functions, the speed of translation of the reel 16 along the axis 16a during winding. Alternatively, if the reel 16 is axially fixed and the pulley 19a is movable in the direction 19b, the modulation is applied to the speed of translation of the pulley 19a along the axis 19b.

A generic periodic time function s(t) with a period T has a fundamental frequency $f_0 = 1/T$ and can be expressed by means of the Fourier series expansion:

$$s(t) = \sum_{k=-\infty}^{+\infty} S(kf_0)f_0 e^{i2\pi k f_0 t}$$

where k assumes whole values and:

$$S(kf_0) = \int_{-\infty}^{+\infty} s(t)e^{-i2\pi k f_0 t} dt$$

Preferably, the function chosen for modulating the winding pitch comprises a low number of harmonics (i.e. sinusoidal components with multiple frequency of the fundamental) so that the fundamental frequency $f_0$ is easily extractable. More preferably, this periodic function is a sinusoidal function and is therefore characterized by a single frequency.

A modulation frequency $f_{mod}$ which coincides with the fundamental frequency of the particular periodic function chosen is therefore associated with the winding pitch.

Figure 4:
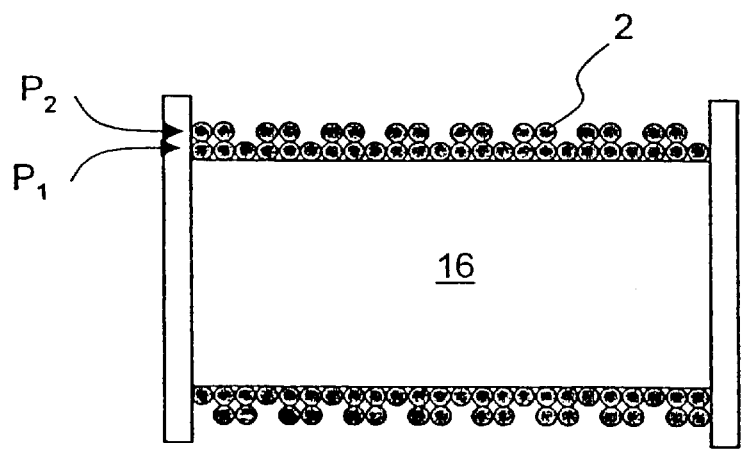
FIG. 4 shows, in a schematic and simplified form, a reel onto which an optical fibre is wound in accordance with the method of the invention.

In order to distinguish the different fibre portions it is also possible to modulate the winding pitch with functions of a different type, chosen among constant functions, sinusoidal functions or periodic functions with several harmonics. For example, a first portion may be wound with a constant pitch, a second portion with a pitch modulated with a triangular type function, a third portion with a pitch modulated with a sinusoidal function, and so on. If, on the other hand, the fibre is substantially homogeneous and uniform over its entire length, except for in a predefined number of portions, as for example in the case where Bragg gratings are formed along the fibre, it may be preferable to assign a constant winding pitch to the fibre and to vary the winding pitch, for example modulating it with periodic functions, along the portions with different characteristics. FIG. 4 shows, purely by way of example, a winding formed in accordance with the technique of the invention, in which the first layer of the winding relates to a first fibre portion $P_1$ with which a constant winding pitch is associated, while the second layer relates to a second fibre portion $P_2$ with which a pitch modulated with a periodic function is associated.

In order to obtain a modulation of the winding pitch in accordance with a predefined periodic function, the unit 21 must send to the member 17 (or to the member moving the pulley 19a, if it is the latter which is movable), a control signal modulated in accordance with the desired law. This signal must have a different sign every time the wound fibre 2 has completed a layer on the reel 16.

In the most general case, the translation speed $v_i(t)$ imparted to the reel 16 (or to the pulley 19a) for winding the portion $P_i$ will be the sum of a constant term and a modulated term:

$$v_i(t)=v_0(1+F_i(t))$$

where $F_i(t)$ is the particular function chosen to modulate the winding pitch of the portion $P_i$. The function $F_i(t)$ may be, as described above, a constant function or a more complex function, preferably a periodic function s(t) as defined above.

In the simplest case of a modulating function $F_i(t)$ of the sinusoidal type, the speed $v_i(t)$ of translation imparted to the reel 16 is the result of the sum of a constant term and a sinusoidal term:

$$v_i(t)=v_0(1+A sen 2 \pi f_i t)$$

where $f_i$ is the value of the modulation frequency $f_{mod}$ chosen for winding the portion $P_i$.

The winding pitch p is consequently modulated in accordance with a similar time law:

$$p_i(t)=p_0(1+B sen 2 \pi f_i t)$$

where $p_0=v_0 \cdot T_0$.

If the speed of rotation of the reel 16 is constant, this time law is converted into an equivalent spatial law, where the time t is replaced by the abscissa x measured along the axis of the reel 16. In the case of more complex periodic functions, these time and spatial laws will include a series of harmonics.

Figure 5:
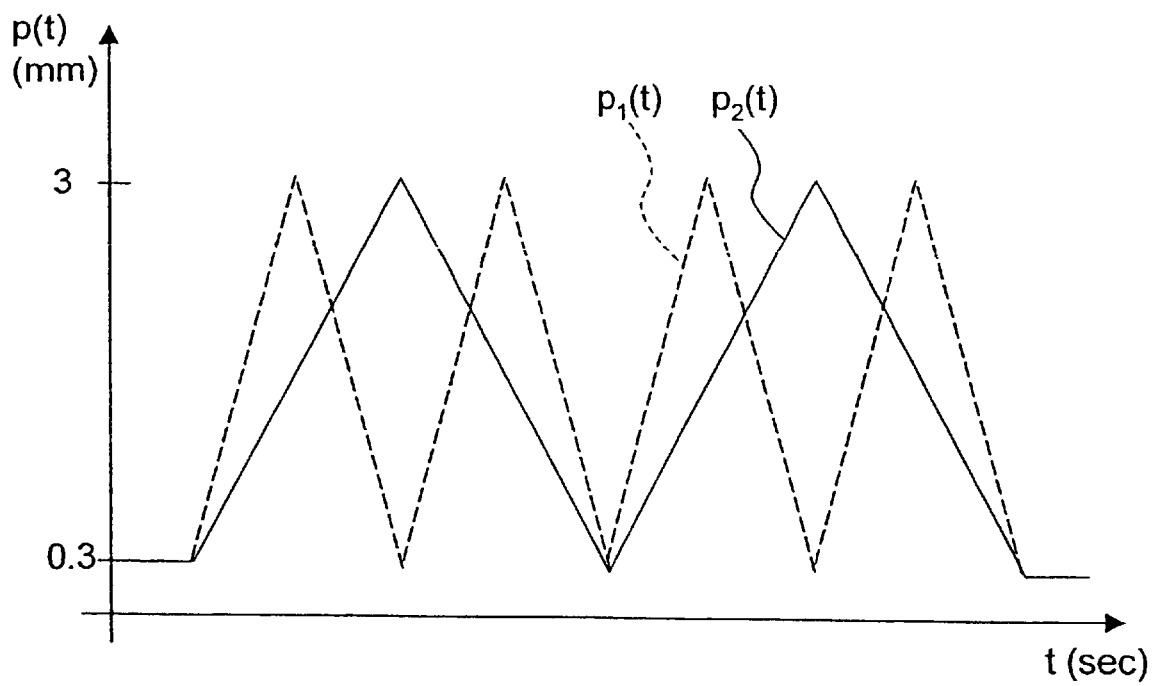
FIG. 5 shows the graphs of two periodic functions used to modulate the winding pitch of the fibre according to the method of the invention.

FIG. 5 shows, purely by way of example, the time progressions of the winding pitches $p_1(t)$ and $p_2(t)$ relating to a first and a second portion $P_1$, $P_2$, respectively. The pitches $p_1(t)$ and $p_2(t)$ are modulated with respective functions $s_1(t)$, $s_2(t)$ of the triangular type, having respective periods $T_1$ and $T_2$ and respective fundamental frequencies $f_1=1/T_1$ and $f_2=1/T_2$. Possible frequency values are for example $f_1$ 32 °Hz and $f_2$=8 Hz. In the example shown, the winding pitches oscillate between a same minimum value $p_{min}$ equal to 0.3 mm and a same maximum value $p_{max}$ equal to 3 mm.

If necessary, the oscillation amplitude of the values of the winding pitch associated with a portion may be different from the oscillation amplitude of the values of the winding pitches of the other portions.

The technique of modulation of the winding pitch using periodic functions has a not insignificant advantage compared to the case where the winding pitches are chosen with constant values. In fact, if the oscillation of the winding pitch values is sufficiently broad to reduce to a negligible level the effects of the mechanical vibrations which generally occur both during winding and during unwinding, the measurement of the winding pitch (in accordance with the technique described below) is subject to very little uncertainty.

Figure 6:
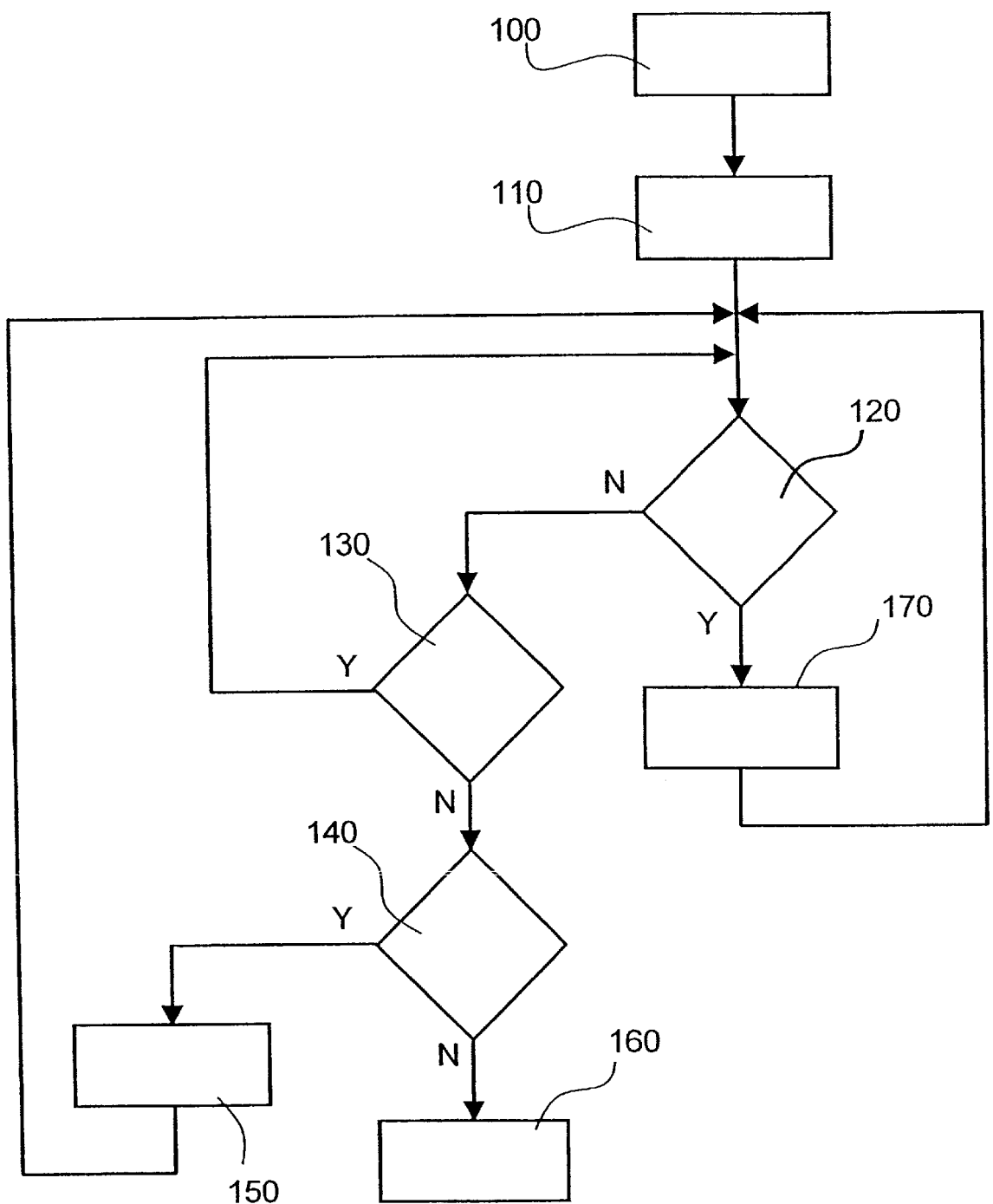
FIG. 6 shows a flow diagram relating to certain steps of the method according to the invention.
Figure 7:
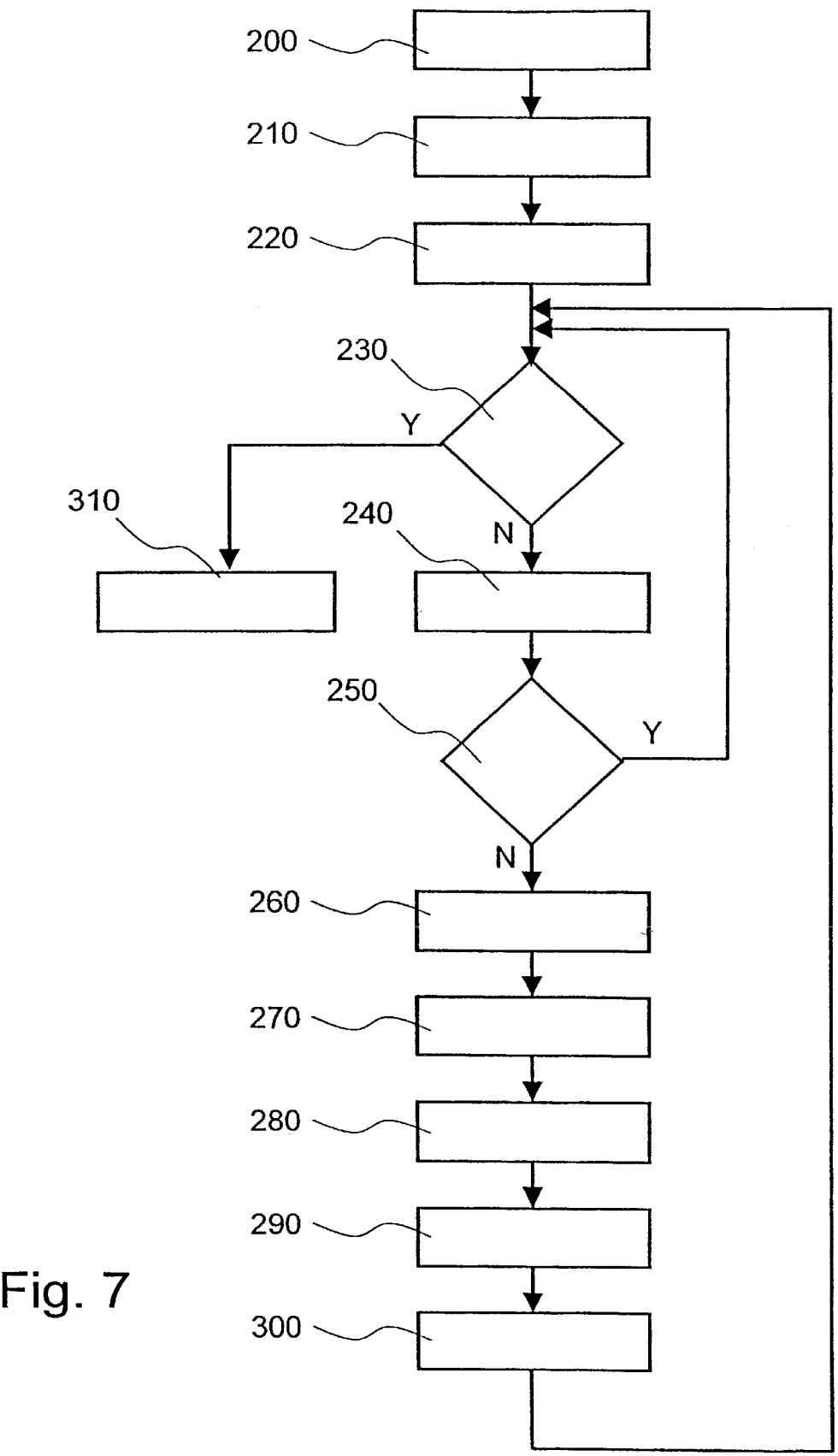
FIG. 7 is a flow diagram relating to further steps of the method according to the invention.

The method according to the invention is described below in detail with reference to the flow diagrams in FIGS. 6 and 7. The method is described with reference to a process for drawing a fibre 2 comprising N consecutive longitudinal portions $P_1$, $P_2$, . . . , $P_N$ in which each portion has at least one detectable characteristic different from the adjacent portions.

In a preliminary step of the method (block 100), the process parameters are entered into the unit 21. In particular, for each longitudinal portion $P_i$ which is to be formed, a group $G_1$ of values of the process parameters is entered, said values being chosen so as to obtain the desired characteristics of the fibre 2. For each portion $P_i$ which is to be formed, a respective spatial law to be associated with the winding pitch of this portion is also entered. Below, only the preferred case where this spatial law corresponds to a periodic function distinguished by a fundamental modulation frequency $f_{mod}$ will be considered. A respective value $f_i$ of the modulation frequency $f_{mod}$ of the winding pitch, which is different from that associated with the adjacent portions, is therefore associated with each different portion $P_i$.

On the basis of the length envisaged for the different portions and of the winding speed envisaged, the time intervals $T_1$, $T_2$, . . . , $T_N$ for processing and winding the portions $P_1$, $P_2$, . . . , $P_N$, are also determined. The generic interval $T_i$ is delimited by an instant $t_i$ for end of processing of the portion $P_i$. The unit 21 is provided with an internal clock for measuring the time from the starting instant of the drawing process. Alternatively, instead of predefining the time intervals $T_1$, $T_2$, . . . , $T_N$, it is possible to define the longitudinal portions of the preform 3 intended to form the portions $P_1$, $P_2$, . . . , $P_N$. In this case, the generic instant $t_i$ of end of processing of the portion $P_i$ is detected during the drawing process and coincides with the instant of termination of the preform portion from which the portion $P_i$ of optical fibre has been drawn.

The parameter setting step envisages moreover entering into the unit 21 for each possible process alarm condition detectable on the basis of the signals from the sensors and the detectors positioned along the tower 1, a respective value $f_{Aj}$ of the frequency $f_{mod}$ for modulation of the translation speed of the reel 16, which is different from those used to distinguish the portions $P_1$, $P_2$, . . . , $P_N$. In practice, a respective value $f_{Aj}$ of the modulation frequency fmod is assigned to each alarm code $A_j$. The duration of modulation at the frequency $f_{Aj}$ may coincide with the duration of the alarm condition or, if the duration of the alarm condition is particularly short (as in the case of detection of a surface defect) it may be equal to a predefined duration $T_{Aj}$.

Once entering of the parameters has been completed, the unit 21 sends to the various parts of the tower 1 to which it is connected respective control signals in order to start the drawing process. In particular, the unit 21 activates the various parts, establishing, on the basis of the process parameters of the group $G_1$, the operating conditions envisaged for drawing the first portion $P_1$ (block 110). At the same time, the unit 21 activates its clock and assigns the value 1 to a variable i, which indicates the fibre portion which is currently being processed.

A predefined speed of angular rotation $\omega_{a,1}$ and a translation speed $v_1$ is imparted to the reel 16, the translation speed $v_1$ being equal to:

$$v_1(t)=v_0(1+A\,sen2\,\pi f_1 t)$$

Assuming that the period To of rotation of the pulley 16 is constant, the winding pitch with which the first portion $P_1$ is wound is equal to:

$$p_1(t)=p_0(1+B\,sen2\,\pi f_1 t).$$

During the process of drawing of the fibre 2, the unit 21 continuously receives signals from the sensors and the detectors and checks whether process alarms (block 120) are present.

If no process alarms are present (option N of block 120), the unit 21 checks whether $t<t_i$ (where, in the case of the first portion $P_1$, i is equal to 1), i.e. it checks whether processing and winding of the portion $P_i$ must continue (block 130). If $t<t_i$ (option Y of block 130), i.e. if processing of the portion in question has not yet been completed, processing and winding of this portion continue without modifications. If, on the other hand, processing and winding of the portion in question have been completed (option N of block 130), the unit 21 checks whether $t<t_N$, i.e. if the process of drawing of the fibre 2 must continue or if the end has been reached (block 140). If the end-of-processing instant $t_N$ has not yet been reached (option Y of block 140), the unit 21 increases by one unit the value of the variable i, assigns the value $f_{i+1}$ to the modulation frequency fmod and selects the process parameters $G_{i+1}$ associated with the successive portion $P_{i+1}$ (block 150). The process conditions are consequently modified so as to obtain the conditions envisaged for processing of the portion $P_{i+1}$. At the same time, the unit 21 sends to the member 17, via the interface 23, a signal for modulation of the speed of translation of the reel 16 modulated with the frequency $f_{i+1}$. If the reel 16 is axially fixed and the pulley 19a is axially movable, this modulation frequency is used to modulate the translation speed of the pulley 19a. In each of the two cases, the frequency $f_{i+1}$ is associated with the winding pitch of the new fibre portion $P_{i+1}$.

If, during the drawing process, the unit 21 receives from the sensors and the detectors a signal which identifies a j-th alarm condition (option Y of block 120), the unit 21 generates the corresponding alarm code $A_j$ and assigns to the modulation frequency $f_{mod}$ a value $f_{Aj}$ associated with this alarm code (block 170). A control signal modulated with the frequency $f_{Aj}$ is then sent to the moving member 17 and the winding pitch is modulated in accordance with this frequency. This condition is maintained until the alarm signal stops or, alternatively, after a period $T_{aj}$ from when the alarm signal was received, after which the pre-existing condition relating to the portion $P_i$ is restored (option N of block 120).

The winding process terminates when it is detected that the instant $t_N$ indicating the end of the process has been reached (option N of block 140), in other words when the last portion $P_N$ of fibre has been processed and wound (block 160).

At the end of the drawing process, the fibre 2 is completely wound onto the reel 16. The fibre portions $P_1$, $P_2$, ..., $P_N$ form a given number of winding layers and each of them is wound with its own winding pitch modulated with a respective frequency.

The process of unwinding the fibre 2 from the reel 16 is performed with the aid of the device in FIG. 2 or with that in FIG. 3 and is described below with reference to the flow diagram of FIG. 7.

The fibre unwinding process is initiated (block 200) by imparting to the reel 16 and to the reel 31 respective predefined speeds of rotation which are chosen so that the speed of unwinding of the fibre 2 from the reel 16 is equal to the speed of winding of the fibre 2 onto the reel 31. The speed of rotation of the reel 16 during unwinding $\omega_s$ may be different from the speed $\omega^a$ during winding and, generally, $\omega_s = K\omega_a$ where K is a constant. The speed $\omega_s$ is reached after a short initial transient.

During the process of unwinding from the reel 16, the fibre 2 passes through the sensitive area of the optical sensor 33 and the latter, consequently, generates the signal S (block 210). The same happens in the alternative case of the sensor 38 and each consideration which follows relating to the signal S is to be understood as being applicable also to the signal S'. The signal S, as explained above, is modulated in accordance with a time law similar to the spatial law with which the winding pitch of the fibre portion in question is modulated. In particular, the frequency fs with which the signal S is modulated is linked to the frequency fmod for modulation of the winding pitch of the fibre portion in question by means of the equation $f_s = Kf_{mod}$.

The first unwound portion coincides with the last wound portion, i.e. with the portion $P_N$ or with a portion wound in alarm conditions.

The unit 26 receives the signal S, extracts the frequency value $f_{mod}$ and performs identification of the unwound portion by means of a comparison between the extracted value and the group of frequency values pre-set prior to the drawing process ($f_i$ and $f_{Aj}$). The value of the modulation frequency $f_{mod}$ detected is assigned to a variable f and stored (block 230).

In the case of the device 30 of FIG. 2, upon receipt of the signal S, the unit 26 adjusts, on the basis of the absolute value and the sign of said signal S, the speed of translation of the reel 16. In particular, the speed of translation is adjusted so as to move the actual crossing point of the sensitive area as close as possible to the predefined crossing point and therefore reduce the value of S to a minimum. In this way, the speed of translation of the reel 16 is modulated with the frequency $f_s$. Between the start of the unwinding process and execution of the abovementioned steps involving generation of the signal S and adjustment of the speed of translation of the reel 16, a very short period of time passes so that modulation with frequency $f_s$ of the speed of translation of the reel 16 occurs practically from the start of the unwinding process, after a brief initial transient. The step involving adjustment of the speed of translation of the reel 16 is not present in the case of the unwinding device 30' of FIG. 3.

This first sequence of steps (blocks 200–220) aimed at identifying the first unwound portion and assigning a first value to the variable f is followed by a cycle of steps, described below, for determining the successive portions.

During unwinding of the fibre 2, the unit 26 continually checks whether unwinding of the fibre 2 has been completed (block 230), for example using the signal of a device for detecting the presence of fibre on the reel 16 (not shown). If the unwinding process has not yet been completed, i.e. if the reel 16 still contains fibre to be unwound (option N of block 230), the process continues and the processing unit again processes the error signal S in order to extract the frequency $f_{mod}$ (block 240). The value of the frequency $f_{mod}$ is then compared, by means of a comparison sub-unit (not shown) of the unit 26, with the value associated with the variable f (block 250). If the value of the frequency $f_{mod}$ coincides with the value of f (option Y of block 250), this means that a new portion of fibre is not yet present and, therefore, the cycle of steps just described above (blocks 230–250) may be repeated without variations.

If, on the other hand, the value of $f_{mod}$ is different from the value associated with f (output N of block 250), this means that unwinding of a fibre portion with different characteristics has begun. In this case, the fibre unwinding process is interrupted (block 260) and the unit 26 proceeds to identify, from a comparison of the value of $f_{mod}$ with the stored frequency values, the characteristics of the new fibre portion or the alarm condition with which this frequency is associated (block 270). The unit 26 then supplies to the operator, by means of its own signalling sub-unit, not shown (for example a display sub-unit), an indication as to the fact that the preceding portion has been completely unwound and information relating to the new fibre portion (namely information regarding the characteristics of this portion or, if this portion has been wound in alarm conditions, information as to the alarm conditions which have occurred during winding or regarding any type of defect detected on the portion in question during winding) (block 280). At this point, the operator is able to intervene in order to cut the fibre 2 and replace the reel 31 containing the portion just unwound with an empty reel (block 290). The unwinding process is then started again (block 300) and the steps described above (blocks 230–250 and, if necessary, 260–300) are repeated until it is detected that the fibre has been completely unwound (option Y of block 230), in which case the process ends (block 310).

What is claimed is:

1. Method for producing a fibre element, said method comprising the step of drawing said fibre element from a preform and forming two longitudinal portions ($P_i$) with different characteristics of said fibre element, and being characterized in that it comprises the step of winding said two longitudinal portions onto a support, associating a respective winding pitch ($p_i$) with each of said two longitudinal portions.

2. Assembly for the production of a fibre element, comprising a production apparatus designed to produce a fibre element having at least two longitudinal portions ($P_i$) with characteristics which are different from one another; said assembly being characterized in that it also comprises a winding apparatus designed to receive said fibre element from said production apparatus and wind said fibre element onto a support, associating a respective winding pitch ($p_i$) with each of said portions.

3. Assembly according to claim 2, wherein said winding apparatus comprises:
   a supply member for supplying said fibre element to said support in a predefined supplying direction; and
   an axial moving device for moving either one or other of said support and said supply member in a predefined direction and at an axial speed which is correlated, for each of said portions, to the winding pitch associated with said portion.

4. Assembly according to claim 2, which comprises an apparatus for distinguishing different longitudinal portions of said fibre element wound onto said support, said distinguishing apparatus comprising:
   an unwinding device designed to unwind said fibre element from said support; and
   a detector device for detecting variations in said winding pitch during unwinding of said fibre element.

5. Assembly according to claim 4, wherein said detector device comprises:
   a sensor device designed to generate, on the basis of the point of a sensitive area crossed by said fibre element, a signal (S; S') correlated to said winding pitch; and
   a processing unit designed to receive said signal and obtain, from said signal, a value indicating said winding pitch.

6. Device according to claim 2, wherein said fibre element is an optical fibre and said production apparatus is a drawing tower.

7. Method for winding a fibre element onto a support, said fibre element comprising at least two longitudinal portions ($P_i$) with different characteristics, said method comprising the step of supplying said fibre element to said support and being characterized in that it comprises the step of associating with each of said portions a respective value of a winding parameter ($p_i$) which is different from the values associated with the portions adjacent thereto.

8. Method according to claim 7, wherein said step of associating a respective value of a winding parameter ($p_i$) with each of said portions comprises the step of associating a respective winding pitch ($p_i$) with each of said portions.

9. Method according to claim 8, wherein said step of associating a respective winding pitch with each of said portions comprises the step of associating a respective function ($s_i(t)$) for modulation of said winding pitch with each of said portions.

10. Method according to claim 9, wherein said step of associating a respective function for modulation of said winding pitch with each of said portions comprises the step of associating a respective frequency for modulation ($f_i$, $f_{A,i}$) of said winding pitch with each of said portions, said modulation frequency defining the main frequency of a respective periodic modulation function.

11. Method according to claim 8, wherein said step of associating a respective winding pitch ($p_i$) with each of said portions comprises the step, performed at the same time as said step of supplying said fibre element to said support, of translating said support in a predefined direction at a speed correlated to said winding pitch.

12. Method according to claim 8, wherein said step of supplying said fibre element to said support comprises the step of directing said fibre element towards said support by means of a supply member and said step of associating a respective winding pitch ($p_i$) with each of said portions comprises the step, performed at the same time as said directing step, of translating said supply member in a predefined direction at a speed correlated to said winding pitch.

13. Method according to claim 7, wherein said fibre element is an optical fibre and said step of supplying said fibre element to said support is performed at the same time as a step for producing said optical fibre; said production step comprising the step of drawing said optical fibre from a preform.

14. Method according to claim 13, wherein said production step comprises the step, performed during said drawing step, of measuring process variables and signalling, if one of said variables exceeds a predefined threshold, a respective alarm condition indicating the presence of a fibre portion with a defect; said step of associating a respective value of a winding parameter ($p_i$) with each of said portions comprises the step of associating a respective value of said winding parameter ($p_i$) with said fibre portion which has a defect.

15. Method for distinguishing different longitudinal portions of a fibre element wound onto a support according to the method of claim 7, each of said portions being associated with a respective winding pitch, comprising the steps of:
   unwinding said fibre element from said support; and
   detecting, during said unwinding step, variations in said winding pitch.

16. Method according to claim 15, wherein said step of detecting variations in said winding pitch comprises the steps of:

repeatedly measuring, during said unwinding step, a parameter correlated to said winding pitch in order to obtain successive values of said parameter; and detecting variations in the value of said parameter.

17. Method according to claim 16, comprising the steps of:

comparing each of said obtained values of said parameter with a set of stored values, each of said stored values being associated with one of said portions; and identifying, on the basis of said comparison, the longitudinal portion associated with said value obtained.

18. Method according to claim 16, wherein said step of measuring said parameter comprises the step of detecting the distance between an actual point where a predefined area is crossed by the fibre element and a predefined crossing point of said area.

19. Method according to claim 16, wherein said step of measuring said parameter comprises the step of detecting the angle between a direction of unwinding of the fibre element from the support and a predefined direction.

20. Apparatus for winding a fibre element onto a support, said fibre element comprising at least two longitudinal portions ($P_i$) with different characteristics, said apparatus comprising:

a supply member for supplying said fibre element to said support; and a moving device for moving either one or other of said support and said supply member along a predefined axis and at a predefined speed of translation so as to obtain a predefined winding pitch;

and being characterized in that the apparatus comprises a unit for controlling said moving device, designed to control said speed of translation so as to associate with each of said portions a respective winding pitch ($p_i$) different from the winding pitches associated with the portions adjacent thereto.

21. Apparatus according to claim 20, wherein at least one of said winding pitches is modulated with a periodic function.

22. Apparatus according to claim 20, wherein said fibre element is an optical fibre.

23. Apparatus for distinguishing different longitudinal portions of a fibre element wound onto a support, each of said portions having associated with it a respective winding pitch ($p_i$), characterized in that the apparatus comprises:

a device for unwinding said fibre element from said support;

a sensor device designed to measure repeatedly a parameter correlated to said winding pitch and generate a signal (S; S') indicating said parameter; and a processing unit designed to receive said signal and detect, on the basis of said signal, variations in said parameter.

24. Apparatus according to claim 23, wherein said sensor device is an optical device which has a sensitive area and a reference point on said sensitive area and is designed to detect the distance between the point where said sensitive area is crossed by the said fibre element and said reference point.

25. Apparatus according to claim 23, wherein said sensor device is a device designed to detect the angle between a direction of unwinding of the fibre element from the support and a predefined direction.

* * * * *